March 20, 1945.  E. H. LAND  2,372,091

DEVICE FOR MEASURING VERTICAL ANGULAR DEVIATION

Filed Aug. 14, 1942  2 Sheets-Sheet 1

INVENTOR.
Edwin H. Land
BY Donald L. Brown
Attorney

March 20, 1945.　　　E. H. LAND　　　2,372,091
DEVICE FOR MEASURING VERTICAL ANGULAR DEVIATION
Filed Aug. 14, 1942　　　2 Sheets-Sheet 2
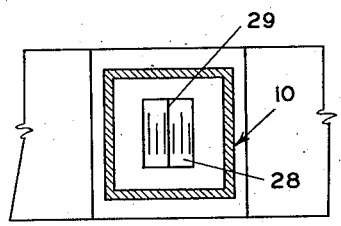
FIG. 3
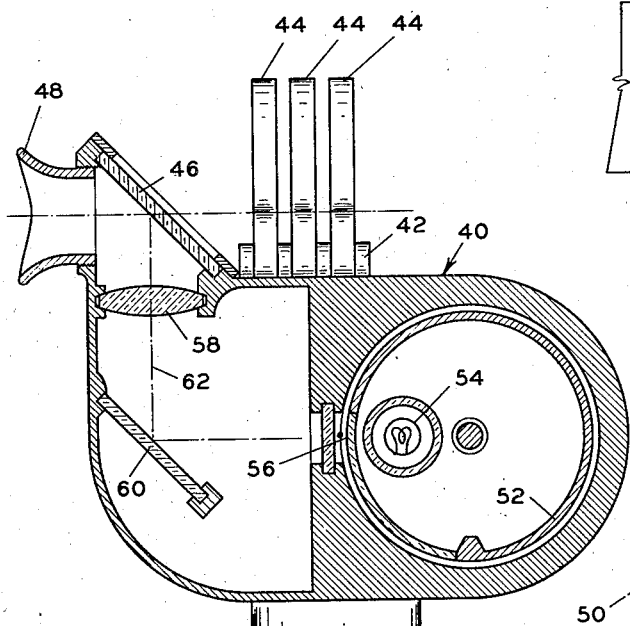
FIG. 4　　　FIG. 5
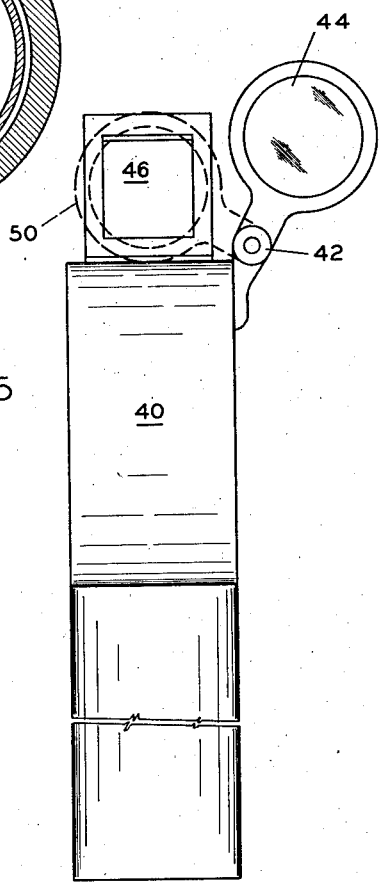
INVENTOR.
Edwin H. Land
BY Donald L. Brown
　　Attorney Patented Mar. 20, 1945

2,372,091

UNITED STATES PATENT OFFICE 2,372,091

DEVICE FOR MEASURING VERTICAL ANGULAR DEVIATION

Edwin H. Land, Cambridge, Mass., assignor to Polaroid Corporation, Cambridge, Mass., a corporation of Delaware Application August 14, 1942, Serial No. 454,794

2 Claims. (Cl. 88—2.2)

This invention relates to an improved device for measuring vertical angular deviation.

An object of the invention is to provide a device of the character described, such as a sextant or the like, in which the vertical angular deviation of any object from the true horizontal may be determined promptly, directly and accurately without employing a horizon, either real or artificial.

Other objects of the invention are to provide a device of the character described comprising means for impressing on the field of view and superimposed upon the object whose vertical angular deviation from the horizontal is being measured, the image of a scale, for example in degrees and fractions thereof; to provide in such a device an optical system comprising a transparent mirror, a collimating lens and a freely rotatable scale-bearing member for accomplishing the desired result, and to provide means for so positioning said elements that an image of a predetermined portion of said scale will appear to an observer as superimposed upon or positioned closely adjacent an object in the center of the field of view.

Other objects of the invention will in part be obvious and will in part appear hereinafter.

The invention accordingly comprises the apparatus embodying features of construction, combination of elements and arrangement of parts, all as exemplified in the following detailed disclosure, and the scope of the application of which will be indicated in the claims.

For a fuller understanding of the nature and objects of the invention, reference should be had to the following detailed description, taken in connection with the accompanying drawings in which:

Fig. 3 is a fragmentary view in horizontal section taken along the line 3—3 in Fig. 1;

Fig. 4 is a view similar to Fig. 1, partially in section and partially in elevation, of a modification of the invention; and Fig. 5 is a view in end elevation of the device shown in Fig. 4.

Figure 1:
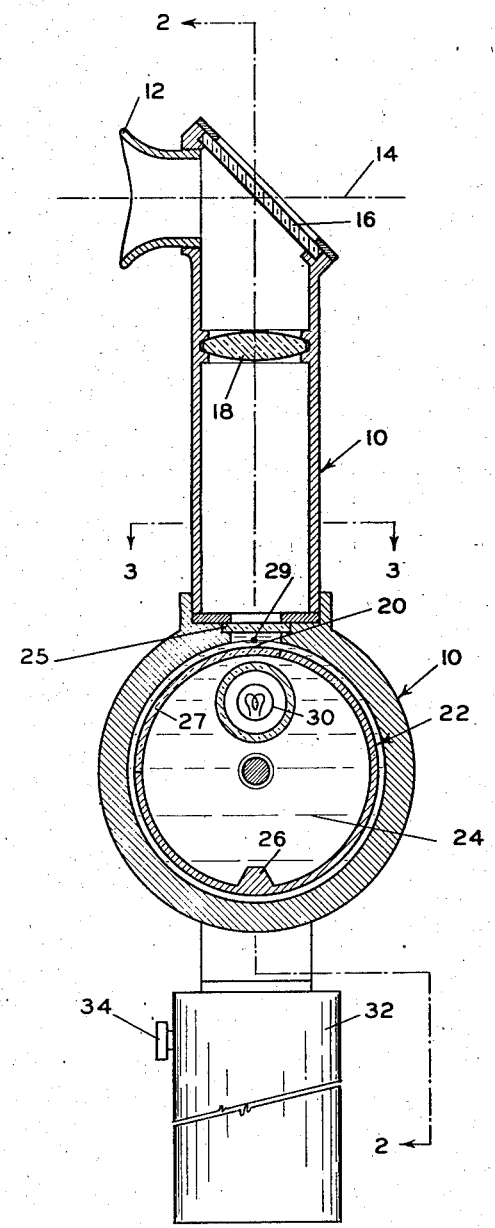
Figure 1 is a view, partially in vertical section and partially in elevation, of one embodiment of the invention, taken along the line 1—1 of Fig. 2.
Figure 2:
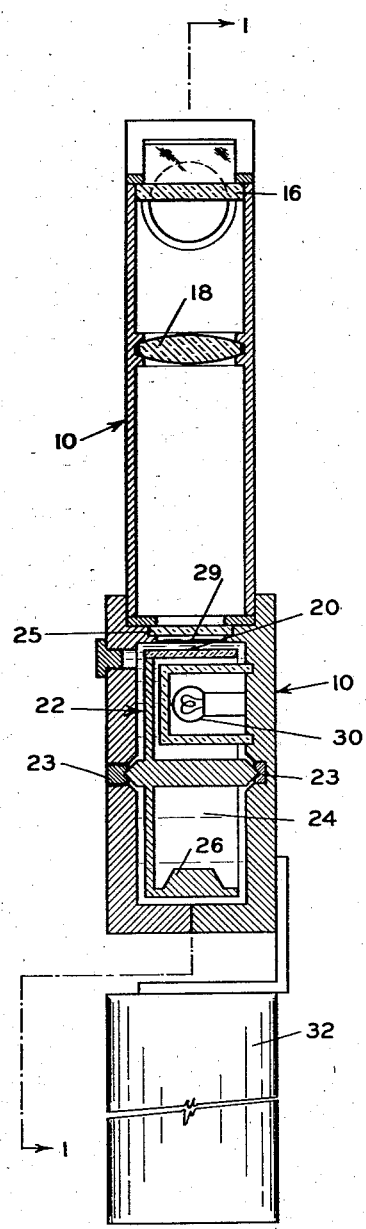
Fig. 2 is a view, partially in vertical section and partially in elevation, taken along the line 2—2 of Fig. 1.

In the embodiment of the invention shown in Figs. 1-3, inclusive, 10 represents a housing in which the cooperative elements of the device may be mounted. The housing may be of any suitable size and shape and is to be understood as not limited to the shape shown. Mounted in the housing is an eyepiece 12, which may have associated therewith any suitable lens system, for example such a lens system as is shown somewhat diagrammatically in Figs. 4 and 5.

In the path 14 of light rays traversing the eyepiece, there is positioned a transparent mirror 16 so positioned that an observer looking along the path 14 will see superimposed upon the field of view, and preferably substantially at the center thereof, an image of, for example, a portion of a scale. This is accomplished in the following manner.

The housing 10 may comprise a substantially vertical member having mounted therein a collimating lens 18 with its focal point 20 coinciding with the surface of a rotatable element 22, mounted in the housing 10.

The element 22 may be spherical or cylindrical or otherwise so shaped that as it rotates its surface remains at the focal point 20 of lens 18. Element 22 is preferably freely rotatable. It may be mounted in non-friction bearings 23 or may float in a transparent liquid such as an oil 24. It should preferably be weighted as at 26 so as to maintain or promptly assume a predetermined position with respect to the horizontal, as the device is inclined in use. Damping means may preferably be employed to prevent too violent oscillation of element 22. The fluid 24 may act to damp the rotation of the element, or any other suitable damping means may be employed.

On portion 27 of the surface of element 22 there is provided a scale, for example a scale in degrees and fractions thereof, as is indicated at 28 in Fig. 3. Scale 28 is so positioned that one reading thereof is at focal point 20 of lens 18, which is overlain by a suitable marker, such as hair line 29. Marker 29 is positioned as close as possible to focal point 20, in order that it may be in focus with scale 28, and it may conveniently comprise an etched line on the surface of window 25 adjacent element 22. Means are provided to illuminate the scale, or so much thereof as lies at focal point 20, and may be positioned within element 22 as at 30, when element 22 is transparent or translucent, or scale 28 may be illuminated from light sources, not shown, positioned elsewhere within housing 10. A suitable source of potential, such as a battery, may be carried in the lower portion of housing 10, as at 32, and this portion of the housing may also serve as a hand grip and may be provided with a switch 34 for energizing light source 30.

Transparent mirror 16 should preferably be so positioned as to superimpose upon substantially the center of the field of view of an observer looking through eyepiece 12 an image of that portion of scale 28 which lies at focal point 20 of lens 18. Where the line of sight 14 is horizontal, this scale reading should be 0°. Scale 28, which may be photographically reproduced on the surface of element 22, should preferably be so arranged that any vertical inclination of the device such as to impart a vertical inclination to the line of sight 14 results in such rotation of element 22 as to bring a corresponding scale reading to the focal point of lens 18, and hence into superimposed position in the center of the field of view. For example, if the vertical inclination of the line of sight 14 is 22° 30', that reading should appear on scale 28 at focal point 20 of lens 18. It will be apparent that a line passing through the center of lens 18 and focal point 20 need not be perpendicular to the line of sight 14 although this condition may be preferred.

It is expected that the device of the present invention will find its greatest use in the measurement of the vertical angular deviation of objects at considerable distances from the observer. If lens 18 is a collimating lens, a condition which has already been indicated as preferred, the image of the scale reading superimposed on the field of view will appear to be focussed clearly on objects at all distances from the observer between a few yards from the instrument and an infinite distance therefrom.

It is believed that the operation of the device will be apparent from the foregoing description. When an observer wishes to measure the vertical angular deviation of any object from his position, he simply looks at the object along the line of sight 14, centering it in his field of view. The rotatable element 22 will immediately, or very promptly, show such relative rotation with respect to the other elements of the device that the scale reading at the focal point 20 of lens 18 will represent accurately the vertical angular deviation of line of sight 14. This scale reading, falling upon transparent mirror 16, will appear to the observer as directly superimposed upon the object viewed and he will thus be able to read directly and instantaneously the vertical angular deviation of the object.

In the embodiment of the invention shown in Figs. 4 and 5, the housing 40 is of a different and somewhat more compact shape than in the embodiment of the invention shown in Figs. 1 to 3, inclusive. There are pivotally mounted upon the housing, as for example at 42, a plurality of lens elements 44, any one or more of which may be moved into position to intercept light traversing the transparent mirror 46 and the eyepiece 48, as shown by the dotted lines at 50 in Fig. 5. In this embodiment of the invention also, the weighted, freely pivotal, scale-bearing element 52 is shown as provided with an internal source of illumination 54 for the scale. The housing here is so shaped that light emanating from the source 54 and illuminating the focal point 56 of collimating lens 58 is incident on and reflected from mirror 60, which is shown as positioned between the lens 58 and the element 52. The path of such light rays is illustrated generally by the broken line 62.

Since certain changes may be made in the above construction, and different embodiments of the invention could be made without departing from the scope thereof, it is intended that all matter contained in the above description or shown in the accompanying drawings shall be interpreted as illustrative and not in a limiting sense.

It is also to be understood that the following claims are intended to cover all the generic and specific features of the invention herein described and all statements of the scope of the invention which, as a matter of language, might be said to fall therebetween.

What is claimed is:

1. In an inclinometer having a housing provided with a transparent window, a cylinder rotatably mounted in said housing in a position to have a part of its periphery always in the field of view of said window, said cylinder having at least the part thereof viewable through said window formed of a material which transmits light, scale means carried on the part of the periphery of said cylinder viewable through said window, weight means carried by said cylinder for retaining it against rotation, liquid means substantially filling said housing for damping the motion for said rotatable element, index means carried by said window in superposed relation to said scale means, and a light source inserted and mounted within said cylinder for transmitting light through said scale means and said window.

2. In an instrument for measuring vertical angular deviation having a housing formed of a main portion provided with a light transmitting window therein and a chamber portion extending from the main portion and aligned with said window, whereby light transmitted through said window enters the chamber portion, ocular means at the end of the chamber portion away from the main portion of the housing for viewing an object to be observed, transparent reflecting means aligned with the ocular means and through which an observer looks when viewing an object, said transparent reflecting means also being aligned with said chamber portion for receiving light passing through the chamber portion and reflecting it into the ocular means, and lens means in the chamber portion collimating light passing therethrough and to said transparent reflecting means, in combination, illuminated inclinometer means carried by the main portion of said housing for indicating the vertical angular deviation of an object being observed through the ocular means and the transparent reflecting means, said illuminated inclinometer means comprising a cylinder rotatably mounted in said main portion of the housing in a position to have a part of its periphery always in the field of view of said window, said cylinder having at least the part thereof viewable through said window formed of a material which transmits light, scale means on the part of the periphery of said cylinder viewable through said window, index means carried by said window in superposed relation to said scale means, weight means carried by said cylinder for retaining it against rotation, liquid means substantially filling the main portion of said housing for damping the motion for said rotatable element, and a light source inserted and mounted within the cylinder to transmit light through said scale means and window to said lens means and transparent reflecting means whereby to image the scale means and index means in the field of view of the ocular means.

EDWIN H. LAND.